United States Patent

[11] 3,554,236

[72] Inventor Clifford A. Rhodes
2816 German St., Erie, Pa. 16504
[21] Appl. No. 779,107
[22] Filed Nov. 26, 1968
[45] Patented Jan. 12, 1971

[54] STACKABLE WIRING DUCT
5 Claims, 3 Drawing Figs.
[52] U.S. Cl..................................... 138/117,
46/25, 287/103
[51] Int. Cl..................................... F16l 9/22
[50] Field of Search......................... 138/117,
177, 178, 111; 46/25; 287/103; 52/731

[56] References Cited
UNITED STATES PATENTS
836,121 11/1906 Kirkpatrick.................. 138/117
3,144,881 8/1964 Sproull........................ 138/117
3,310,906 3/1967 Glukes........................ 46/25

Primary Examiner—Louis K. Rimrodt
Attorney—Charles L. Lovercheck

ABSTRACT: A raceway made up of a plurality of raceway units for electrical wiring or the like which may be placed one on top of another to form a multiple raceway assembly. The raceway assembly provides separate raceway conduits for isolating different types of wiring. A joint structure is provided for holding the sections of the raceway firmly together. The joint structure is the form of grooves that receive cylindrical beads. The grooves have radii that are slightly greater than the radii of the cylindrical beads so that the beads snap into the grooves and thereby hold the raceway assembly together. The raceway may be cast from metal, extruded from plastic material or made from any other suitable material. The raceway sections may be easily added to or changed without disturbing the wiring in the other raceways.

PATENTED JAN 12 1971  3,554,236

Clifford A. Rhodes — Inventor

STACKABLE WIRING DUCT

STATEMENT OF INVENTION

This invention relates to raceways for electrical wiring and the like and, more particularly, to raceway units which may be placed one on top of another to form a raceway assembly. The raceway assembly provides numerous sections for isolating different types of wiring.

OBJECTS OF THE INVENTION

It is an object of the invention to provide a raceway which is light in weight and strong and is composed of parts which can be assembled readily and will hold together securely. It is preferred that the parts be thus engaged by snap action without requiring to be secured in assembled relation by separately actuated fasteners.

Another object of the invention is to provide a raceway assembly which may have an indefinite number of raceway sections for isolating power and branch circuits or the like.

Another object is to provide a raceway assembly which may be partially disassembled for the purpose of adding, changing, or removing wires from one or more raceway sections without disturbing wires in any other section.

Another object is to provide a raceway assembly whereby wires may be introduced into any section of the raceway from either side.

Other objects and advantages of the invention will become apparent as the invention is described in connection with the accompanying drawings and more particularly pointed in the appended claims in which:

DETAILED DESCRIPTION OF DRAWINGS

Figure 1:
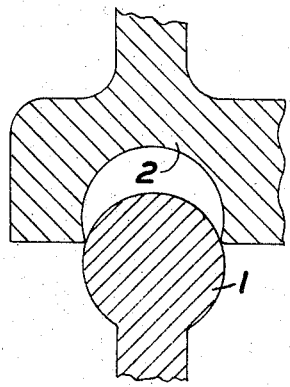
FIG. 1 is an enlarged cross-sectional view taken on line 1—1 of FIG. 2.
Figure 2:
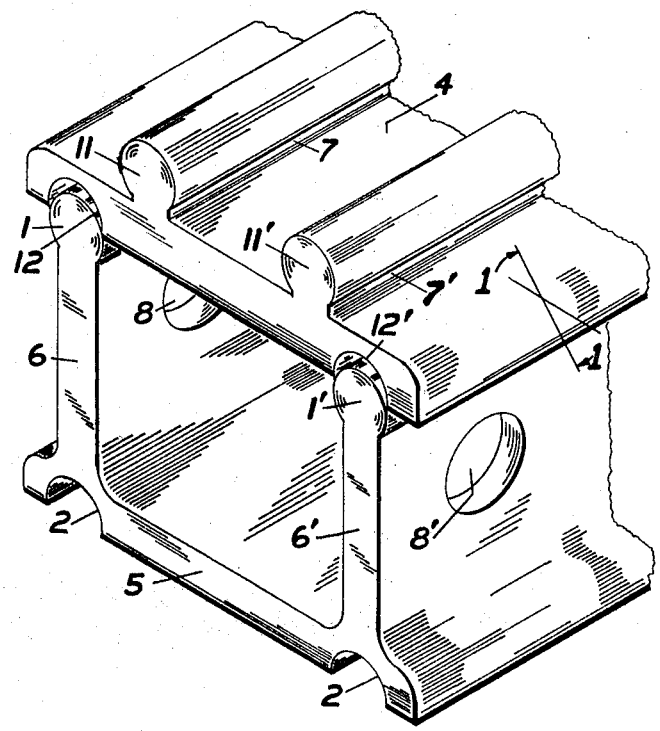
FIG. 2 is a perspective view of a raceway section formed from joining two parts of an embodiment of the invention.

Now with more particular reference to the drawings, a raceway assembly is shown made up of sections which may be moved about, put together in different combinations to provide the desired number of raceway units. The raceway sections may be made up of integral bodies each having a bottom web 5 and sides 6 and 6'. The sides 6 and 6' are integrally attached to the bottom.

The cover 4 has cylinders 11 and 11' integrally attached to their edges by the standoff sections 7 and 7'. The cylindrical beads 1 and 1' are of a radius approximately equal to the radius of the cylindrical groove 2, 2', 12, 12', 102, 102' 112, 112' and the cylindrical grooves are slightly greater in depth than the radius of its curvature so that the beads 1 and 1' snap into the groove and are held in place by the material. The beads 1 and 1' are integrally fixed to the sides 6 and 6'. The sections on top of the sections just described are slightly smaller in scale and have a bottom web 115 integrally attached to sides 106 and 106' and cylindrical beads 101 and 101' are integrally attached to the upper ends of the sides 106 and 106'. The covers 104 are integrally attached to the cylindrical beads 111 and 111' and have grooves 112 and 112' which receive the cylindrical beads 101 and 101'. Cylindrical beads 11 and 11' are received in cylindrical grooves 102 and 102'. The raceway sections may be formed from plastic, metal, or any other suitable resilient material by means of extruding, castings, or other operation to create a two-piece section as shown.

Figure 3:
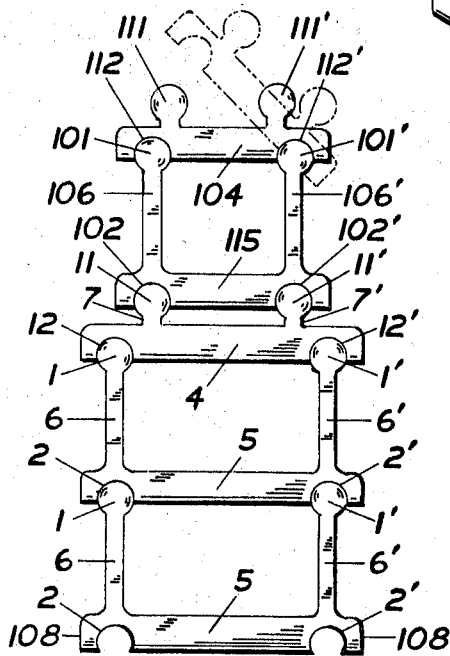
FIG. 3 is an end view of a typical raceway assembly formed by joining three raceway sections and two covers.

FIG. 3 shows a typical raceway assembly that may be built by using three base sections and two cover portions. When one section is placed on another, pressure must be applied to the upper section in a downward direction so that the cylindrical beads will engage in the concave groove and lock themselves in place. Repeating this procedure with each section, the final results give a raceway assembly with three isolated wiring sections.

Access holes 8 and 8' are located in both sides of the base section so that wires may be introduced into the raceway from either side.

The raceway may be disassembled to any extent by applying pressure in an upward direction. If only one side of the raceway is disengaged, the raceway will swivel to the phantom line position shown in FIG. 3 at the remaining joint giving access to the inside of the raceway for ease of wiring.

In the description and claims, reference to bottom, top, sides and the like are in connection with the structure as oriented in the drawing and such references are in no sense intended to limit the invention from utilizing the raceways oriented to different positions.

It will be noted that the ends 108 of the sections extend out beyond the sides so that the resiliency of the material is amplified by the overhanging ends in removing or inserting the beads into the grooves.

I claim:

1. A raceway made up of a plurality of sections including base sections and cover sections:

said base sections each having a web section and sides defining a channel of rectangular cross section for receiving wires and the like;

said sides terminating in a cylindrical bead; said beads being fixed to said sides generally parallel to the said sides;

said cover sections each having two spaced grooves in a first side thereof;

said grooves having a cross-sectional shape defining a cylindrical surface of approximately the same radius as said beads;

said grooves having a depth slightly greater than the radius of said bead; and said cover section being made of a resilient material whereby said bead snaps into said groove and said bead is retained in said groove by the material of said cover extending around said bead beyond a plane passing through the center of said bead parallel to said cover.

2. The raceway recited in claim 1 wherein said base section has at least two grooves in the outside surface:

a second base section similar to said first mentioned base section is supported adjacent said first mentioned base; and said grooves in the outside of said first mentioned base section receiving said beads on said second mentioned base section.

3. The raceway recited in claim 2 wherein said grooves in the outside of said base sections are formed in the lower side of said web.

4. The raceway recited in claim 1 wherein said cover has cylindrical beads thereon:

a second base section;

spaced longitudinal grooves in the outside surface of said second base section;

said beads on said cover being received in said grooves in the outside of said second base section, a second cover;

said second cover having spaced grooves therein;

beads on the upper edges of said second base section; and said beads on said second base section being received in said grooves in said second cover.

5. In combination a plurality of first raceway sections and cover sections:

said raceway sections being in the form of channels having upwardly extending edges;

a cylindrical bead fixed to one said edge and extending along said edge;

a groove in said cover adapted to receive said bead; and said groove being slightly deeper than the radius of said cylindrical bead.